United States Patent
Kosaki

[11] Patent Number: 5,889,488
[45] Date of Patent: Mar. 30, 1999

[54] MOBILE COMMUNICATION SYSTEM

[75] Inventor: Hitoshi Kosaki, Tokyo, Japan

[73] Assignee: Mitsubishi Denki Kabushiki Kaisha, Japan

[21] Appl. No.: 806,743

[22] Filed: Feb. 27, 1997

[30] Foreign Application Priority Data

Aug. 28, 1996 [JP] Japan .................................... 8-226862

[51] Int. Cl.$^6$ .................................................. H04B 1/10
[52] U.S. Cl. ............................ 342/17; 375/346; 455/63; 455/296
[58] Field of Search .............................. 342/359, 17, 18, 342/19; 455/501, 504, 63, 296; 370/324; 375/346

[56] References Cited

U.S. PATENT DOCUMENTS

| | | | |
|---|---|---|---|
| 5,574,978 | 11/1996 | Talwar et al. | 455/63 |
| 5,661,724 | 8/1997 | Chennakeshu et al. | 370/324 |
| 5,739,788 | 4/1998 | Oybdal et al. | 342/359 |
| 5,740,208 | 4/1998 | Hulbert et al. | 375/346 |

FOREIGN PATENT DOCUMENTS 3198438  8/1991  Japan .

*Primary Examiner*—Mark Hellner
*Attorney, Agent, or Firm*—Rothwell, Figg, Ernst & Kurz, p.c.

[57] ABSTRACT

A mobile communication system aiming at immediately recovering from radio disturbances which are frequently caused in a communication device mounted on a mobile unit. This mobile communication system is provided with an antenna for transmitting and receiving an electromagnetic wave, a tracking device for adjusting a pointing direction of the antenna to a direction in which an electromagnetic wave arrives, a receiving device for demodulating a received electromagnetic wave, a transmitting device for modulating information, which is to be transmitted, to an electromagnetic wave, a handset for displaying information to a user and for receiving an instruction from a user, and a control unit for controlling the tracking device, the receiving device, the transmitting device and the handset. Further, the control unit forming the heart of this system has a countermeasure device, a display unit and a fault inferring device. Moreover, the inference of a cause of a radio disturbance is performed by monitoring the variation in the signal level of a received signal and being based on a pattern of the obtained variation.

10 Claims, 15 Drawing Sheets

FIG. 1

| INDICATORS \ CAUSES OF FAULT | BLOCKING | SHADOWING | FADING | FAULTY TRACKING | BEAM SWITCHING |
|---|---|---|---|---|---|
| RECEIVED SIGNAL LEVEL | ABRUPTLY LARGELY DROPS | ABRUPTLY SLIGHTLY DROPS | VARIES AT SHORT PERIOD | SLOWLY DROPS | SLOWLY DROPS |
| RECEIVED-SIGNAL C/N | ABRUPTLY LARGELY DROPS | ABRUPTLY SLIGHTLY DROPS | VARIES AT SHORT PERIOD | SLOWLY DROPS | SLOWLY DROPS |
| RECEIVED-SIGNAL BER | ABRUPTLY LARGELY DROPS | ABRUPTLY SLIGHTLY DROPS | VARIES AT SHORT PERIOD | SLOWLY DROPS | SLOWLY DROPS |
| RECEIVED-SIGNAL PER | ABRUPTLY LARGELY DROPS | ABRUPTLY SLIGHTLY DROPS | VARIES AT SHORT PERIOD | SLOWLY DROPS | SLOWLY DROPS |
| TRACKING ERROR | NOT CHANGED | NOT CHANGED | NOT CHANGED | INCREASES | NOT CHANGED |
| OPTICAL IMAGE | LARGE IMAGE OF OBSTACLE IS SEEN IN POINTING DIRECTION OF ANTENNA | SMALL IMAGE OF OBSTACLE IS SEEN IN POINTING DIRECTION OF ANTENNA | IMAGE OF OBSTACLE IS SEEN IN DIRECTION OTHER THAN POINTING DIRECTION OF ANNTENNA | IMAGE IS SHIFTED FROM DIRECTION OF BASE STATION | IMAGE IS OUTSIDE RANGE OF CURRENTI USED BEAM |
| GEOPHYSICAL POSITION WHERE MOBILE UNIT IS PRESENT | NEAR TO OBSTACLE | NEAR TO OBSTACLE | NEAR TO OBSTACLE | UNRELATED | OUT OF RANGE WHERE BEAM IS IRRADIATED |
| RECEIVED CONDITIONS OF ELECTROMAGNETIC WAVE BELONGING TO ANOTHER BEAM | UNRELATED | UNRELATED | UNRELATED | UNRELATED | RECEIVING CONDITION IS IMPROVED |

FIG. 2

| CAUSE OF FAULT | COUNTERMEASURES |
|---|---|
| BLOCKING | STOP UPDATE OF PARAMETER CONCERNING RECEIVER |
| SHADOWING | INCREASE TRANSMITTING/RECEIVING GAIN |
| FADING | CHANGE POINTING DIRECTION OF ANTENNA |
| FAULTY TRACKING | CORRECT TRACKING ERROR PERFORM RESEIZING OPERATION |
| BEAM SWITCHING | SWITCH CURRENTLY USED FREQUENCY TO ANOTHER FREQUENCY OF ELECTROMAGNETIC WAVE BELONGING TO ADJACENT BEAM |

MOBILE COMMUNICATION SYSTEM

BACKGROUND OF THE INVENTION

1. Field of the Invention

This invention relates to a mobile communication system, such as an automobile telephone (or carphone), in which a novel method for inferring a cause of a fault upon an occurrence of a radio disturbance (namely, a radio interference on reception) is realized, for use in a communication system which uses electromagnetic waves and is mounted on a mobile unit such as an automobile or a ship.

2. Description of the Related Art

In a communication system mounted on a mobile unit such as an automobile, radio disturbances (namely, radio interferences on receptions) frequently occur owing to the mobility of the unit, which is shielded by a building as shown in FIG. 13. Main causes of radio disturbances are as follows (incidentally, in the following description, names between quotation marks will be simply referred to).

(1) "Blocking", by which the communication system can hardly receive electromagnetic waves, in the case that the mobile unit is completely shielded by a building or the like.

(2) "Shadowing", by which the intensity of an electromagnetic wave is reduced, in the case that the mobile unit is partially shielded by a building or the like.

(3) Interferential "fading", by which the intensity and phase of a transmitted electromagnetic wave become unstable owing to electromagnetic waves reflected from a building or the like.

(4) "Tracking failure", by which a gain corresponding to a desired electromagnetic wave is reduced as a result of a change in the direction of a directional antenna.

(5) "Beam switching", by which the intensity of a transmitted electromagnetic wave is decreased as a result of the relative movement of the mobile unit, on which the communication system is mounted, from the electromagnetic-wave radiation region (namely, the beam coverage) of a base station, from which the communication system receives electromagnetic waves.

In the case when such a radio disturbance occurs, known mobile communication systems take fixed countermeasures against the failure without determining the cause of the failure. Thus, in the case that the actual cause of the radio disturbance is different from expected or inferred causes thereof, when eliminating the failure, sometimes, it all the more takes time to recover communications.

Hereinafter, the configuration of the known mobile communication system will be described by referring to FIG. 14 which is a diagram illustrating the configuration thereof.

As shown in this figure, the known mobile communication system has: an antenna 1 for transmitting and receiving electromagnetic waves; a tracking unit 2 for adjusting the pointing direction (or orientation) of this directional antenna 1 to a direction in which electromagnetic waves arrive; a receiver 3 for demodulating received electromagnetic waves; a transmitter 4 for modulating a signal, which represents data or information to be transmitted, into electromagnetic waves; a handset 5 for receiving a command or instruction from a user; and a control unit 6 for controlling the tracking unit 2, the receiver 3, the transmitter 4 and the handset 5.

Further, as shown in this figure, the controller 6 has a disturbance detection means 61, a countermeasure means 62 and a display means 63.

Next, an outline of an operation of the known mobile communication system will be described hereinbelow by referring to this figure.

When powering the mobile communication system, the control unit 6 indicates a frequency stored therein to the receiver 3 and further issues a signal representing an "instruction to perform a seizing operation" of seizing electromagnetic waves. In FIG. 14, the signal representing this instruction is described as a "receiver control command". Moreover, the control unit 6 issues another signal representing an instruction for the tracking unit 2 to search for the direction in which electromagnetic waves arrive. In FIG. 14, this signal is described as a "search command".

When receiving this instruction, the tracking unit 2 controls the orientation of the antenna 1 in such a manner as to point to a direction in which electromagnetic waves are in good conditions, by monitoring the received signal level of a signal obtained from the receiver 3 during changing the pointing direction of the antenna 1.

Further, when finishing pointing the antenna 1 to the direction in which the receiving conditions are good, the tracking unit 2 notifies the control unit 6 of the completion of the search. This notification is described as "search completion state" in FIG. 14. Thence, the tracking unit 2 controls the antenna 1 so that the antenna 1 keeps pointing to the direction in which the electromagnetic waves are in good condition. This control operation is called "step tracking".

When notified of the completion of the search, the control unit 6 confirms from a "reception (or receive) state signal" that the reception of a signal can be sufficiently achieved. Then, by transmitting a "receiver control command", which represents the "seizing operation", to the receiver 3, the control unit 6 instructs the receiver 3 to perform an ordinary reception operation.

The display means 63 of the control unit 6 is operative to output a display signal to the handset 5 and receive an operation signal from the handset 5. Thus, the control unit 6 controls the handset 5 in such a way that operations can be performed and displays can be produced in the handset 5.

Further, the disturbance detection means 61 judges from the reception state signal whether or not a radio disturbance occurs. If it is consequently judged that a radio disturbance occurs, countermeasures are performed by the countermeasure means 62. Namely, the system is restored from a fault (or failure) state to a normal state thereof by performing predetermined countermeasures.

For example, in the case that the countermeasure means 62 of the control unit 6 of such a system assumes only the "blocking" as the radio disturbance, when the reception state signal monitored by the disturbance detection means 61 of the control unit 6 indicates an occurrence of a radio disturbance, the countermeasure means 62 instructs the receiver 3 to "stop the update of parameters" concerning AGC (Automatic Gain Controller), AFC (Automatic Frequency Controller) and BTR (Bit Timing Recovery) circuit. Further, the countermeasure means 62 instructs the tracking unit 2 to "stop the step tracking." Thus, when the blocking is stopped, the reception is immediately resumed. Although the system is designed in such a manner, the system cannot deal with failures other than the assumed failure.

Hereinafter, an operation, on which attention is focused for accomplishing the present invention, of the known mobile communication system during unreceivable conditions will be described by referring to FIG. 15. Generally, among various disturbances or failures as above described as examples, the control unit 6 is designed in such a manner as to be able to deal with a plurality of causes of disturbances or failures, as illustrated in FIG. 15, by assuming (or selecting) relatively highly probable (causes of) failures among various disturbances described above as examples. Further, the control unit 6 takes up one of the assumed failures arranged in the descending order of the probability thereof and performs countermeasures against the taken-up failure (or disturbance). Then, if the reception conditions are not improved, the control unit 6 takes up the next one of the assumed failures and performs the countermeasures corresponding thereto. Thus, the known mobile communication system performs fixed countermeasures without positively investigating the cause of the radio disturbance.

Namely, at the time of the unreceivable conditions, namely, at the time of an occurrence of a radio disturbance, the control unit 6 stops the updating of the parameter corresponding to the receiver 3 and also stops the step tracking, which is performed by the tracking unit 2, in step 11. This is a countermeasure against the "fading", the "blocking" and the "shadowing".

Subsequently, in step 12, the control unit 6 judges whether or not the radio disturbance is removed within "t" seconds. This time period of "t" seconds is a time period in which the phenomenon such as the assumed "blocking" can last, for instance, 10 seconds. In the case that the system is restored to a normal state, a program of performing this operation advances to step 17. Conversely, if not, the program advances to the next step 13.

Then, in step 13, the control unit 6 instructs the tracking unit 2 to perform the search, and also instructs the receiver 3 to perform the "seizing" operation. This is a countermeasure against the faulty tracking.

Next, in step 14, the control unit 6 judges whether or not the radio disturbance is removed. If not, the program advances to the next step 15. Conversely, if removed, the program goes to step 17.

Subsequently, in step 15, the control unit 6 whether or not adjacent beam are received in good conditions. If the reception conditions are good, the program advances to step 16. In contrast, if poor, the program goes to step 18.

Next, in step 16, the control unit 6 switches a current beam to an adjacent beam (or cell). This is a countermeasure against the "beam switching". Then, the state of the system is changed to a normal receiving state.

Further, in step 17, the control unit 6 instructs the tracking unit 2 to start the "step tracking", and also instructs the receiver 3 to perform a normal receiving operation. Then, the system is changed to a normal receiving state.

Moreover, in step 18, an object of the processing to be performed by the control unit 6 is returned to an initial circuit (or line).

Incidentally, in the case of a known apparatus, which is disclosed in the Japanese Patent Laid-Open No. 3-198438 and is designed in such a manner that a communication system is installed or placed at a fixed position, the investigation of the cause is performed by monitoring variation in the (signal) levels of received electromagnetic waves and by confirming whether or not a reduction in the received signal level is uniformly achieved. Further, this known apparatus performs only countermeasures against the "absorption fading". However, in the case that this known apparatus is mounted on a mobile unit, various radio disturbances occur with rather a high frequency. Thus, this known apparatus cannot be suitably applied to a mobile communication system. Moreover, this known apparatus requires measuring a plurality of electromagnetic waves, so that a plurality of receivers are necessary. Therefore, from the economical viewpoint, this known apparatus is not suited to a compact communication system to be mounted on a mobile unit.

When a radio disturbance occurs, the known mobile communication system does not effectively determine the cause of the radio disturbance but performs fixed countermeasures against the assumed causes by taking up the assumed causes in the predetermined order. Thus, the known system has problems in that the time required to perform countermeasures, which are not suitable for an actual radio disturbance, is wasted and that if unsuitable countermeasures are performed, it all the more takes time to restore the system to a normal state thereof by removing (the cause of) the radio disturbance.

In the case where the cause of the radio disturbance in the known mobile communication system provided with the recovering method illustrated in FIG. 15 is the fact that the mobile unit, on which the communication system is mounted, moves to and comes to belong to an adjoining beam (or cell), the frequency used in the communication system should be changed to a frequency used in a new beam (or cell). In the case of the aforementioned fault recovery processing, no communication can be established for a time period of (t (seconds)+"the time required to the search by the tracking unit 2"). Thus, a mobile communication system of the present invention is provided with mans for inferring the cause of a radio disturbance and means for selecting a suitable countermeasure, thereby achieving the immediate recovery of the system from radio disturbances.

Differently from communication equipment placed at a fixed position, the communication system mounted on the mobile unit is operative to move and thus cannot be installed at a preselected place where obstacles such as buildings are not present. It is, therefore, inevitable that the mobile communication system frequently becomes unable to receive electromagnetic waves owing to obstacles such as buildings and that various radio disturbances occur in the mobile communication system. Such radio disturbances result in increase in transmission error caused on a communication line and in deterioration of communication quality and, in an extreme case, results in a breakdown of communication.

Further, the countermeasures differ according to the kind of the radio disturbance occurring in the system. Moreover, in the case that unsuitable countermeasures are performed, the system cannot recover from the radio disturbance. Furthermore, even when the cause of the radio disturbance is removed, sometimes, it all the more takes time to restore the system to a normal state. Further, in extreme cases, the recovery of the system cannot be achieved.

This invention is accomplished to solve the aforementioned problems of the known communication systems.

SUMMARY OF THE INVENTION

It is, accordingly, an object of the present invention to provide a mobile communication system which can achieve the immediate recovery of a receiving operation by inferring the cause of a radio disturbance and performing suitable countermeasures, differently from the known communication system adapted to perform fixed countermeasures without inferring the cause of a radio disturbance, and which can remove the cause of a radio disturbance in some cases.

To achieve the foregoing object, in accordance with the present invention, there is provided a mobile communication system which comprises: an antenna for transmitting and receiving an electromagnetic wave; receiving means for demodulating received electromagnetic wave; transmitting means for modulating information, which is to be transmitted, onto an electromagnetic wave; and control means for inferring a cause of a radio disturbance according to a received signal and for selecting a countermeasure corresponding to this inferred cause of the radio disturbance.

Further, the aforesaid control means has fault (or cause-of-fault) inferring means for inferring a cause of a radio disturbance according to a time-varying pattern of a received signal which is obtained from the receiving means.

Thereby, when recovering from the disturbance, namely, eliminating a cause thereof, the communication system is immediately put into a state in which a communication can be established with another communication system.

An embodiment of the mobile communication system of this invention further comprises: tracking means for adjusting a pointing direction (or orientation) of the antenna to a direction in which an electromagnetic wave arrives. Further, the aforesaid fault inferring means infers the cause of the radio disturbance according to the time-varying pattern of the signal level of the received signal and to a tracking error obtained from the aforesaid tracking means.

As a result, when recovering from the disturbance, namely, eliminating a cause thereof, the communication system is immediately put into a state in which a communication can be established with another system. Moreover, a judgement on a faulty tracking can be conducted more accurately.

Another embodiment of the mobile communication system of this invention further comprises: a global-positioning-system (GPS) antenna for receiving geographically positional information; and GPS receiving means for demodulating the geographically positional information. Further, the aforesaid fault inferring means infers the cause of the radio disturbance according to the time-varying pattern of the signal level of the received signal and to the geographically positional information obtained from the aforesaid GPS receiving means.

As a consequence, when recovering from the disturbance, namely, eliminating a cause thereof, the communication system is immediately put into a state in which a communication can be established with another system. Moreover, a judgement on the disturbance by the beam switching can be made accurately.

Still another embodiment of the present invention further comprises: optical image input means for inputting an optical image. Moreover, the control unit infers a cause of the radio disturbance according to an optical image obtained from the optical image input means.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 1 is a diagram illustrating a table which presents the movements (or changes) of indicators respectively corresponding to the causes of radio disturbances in each of embodiments of the present invention;

FIG. 2 is a diagram illustrating a table which represents countermeasures corresponding to the causes of the radio disturbances in each of embodiments of the present invention;

DESCRIPTION OF THE PREFERRED EMBODIMENTS

Figure 3:
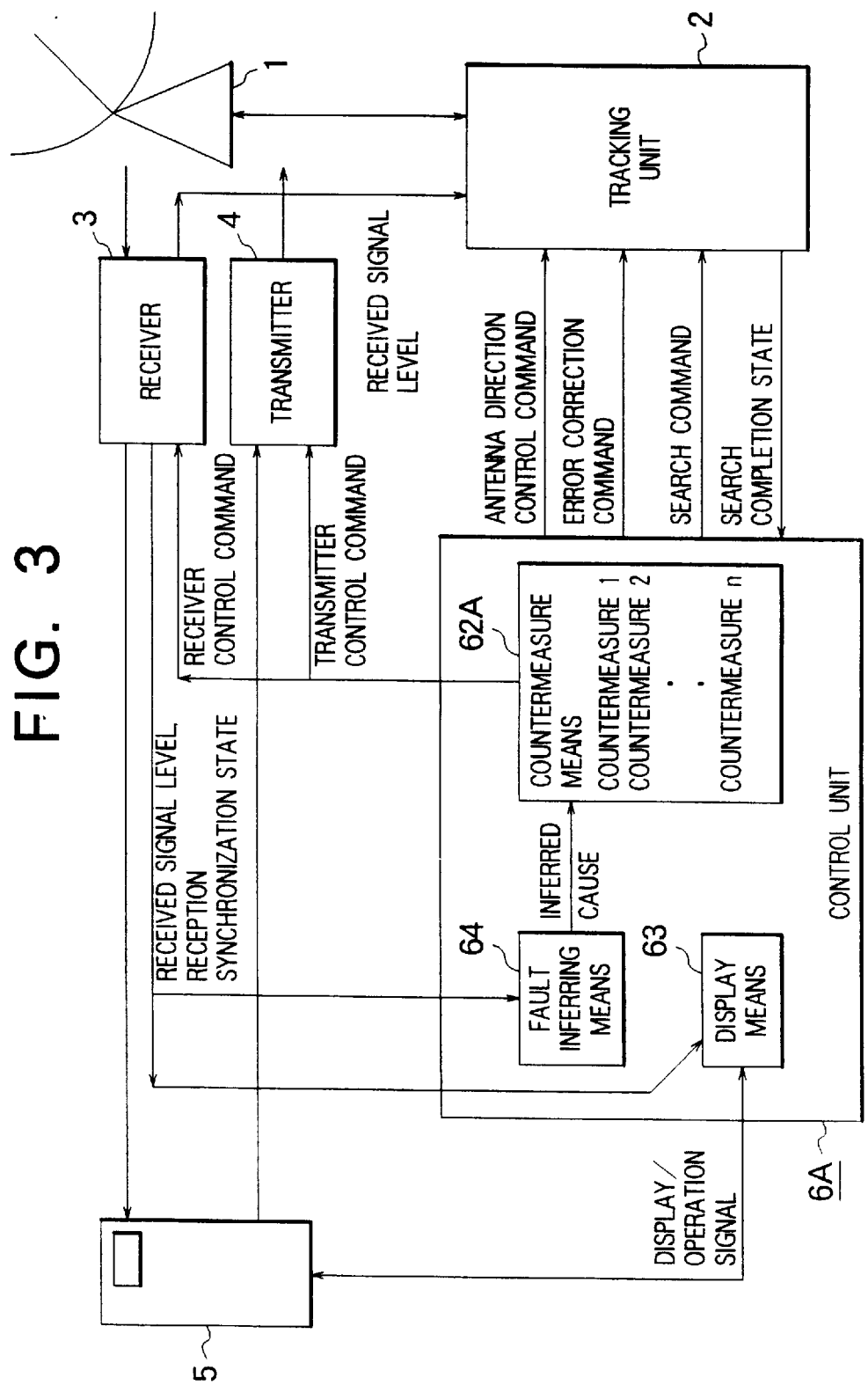
FIG. 3 is a diagram illustrating the configuration of a mobile communication system which is Embodiment 1 of the present invention.

Hereinafter, the preferred embodiments of the present invention will be described in detail by referring to the accompanying drawings.

Mobile communication system embodying the present invention has fault inferring means for inferring a cause of a radio disturbance and countermeasure means for performing a suitable countermeasure against the inferred cause.

The fault inferring means infers a cause of a radio disturbance by using all or part of the following indicators:
(1) Received (signal) Level (of a received signal);
(2) Received-Signal C/N (Carrier to Noise Ratio) thereof;
(3) Received-Signal BER (Bit Error Rate) thereof;
(4) Received-Signal PER (Packet Error Rate) thereof;
(5) Tracking Error (in the direction of an antenna);
(6) Optical Image;
(7) Geographical position where the mobile unit is present; and
(8) Conditions of receiving an electromagnetic wave belonging to another beam.

The aforementioned indicators make movements (or change) correspondingly to the causes of radio disturbances, as described in a table of FIG. 1. Thus, all or part of the indicators listed in this table are monitored. The cause corresponding to the indicator, which has the highest degree of similarity between currently monitored movement (or change) and the movement (or change) presented in the table, is inferred as the cause of the radio disturbance. FIG. 1 is a diagram illustrating a table which presents the movements (or changes) of indicators respectively corresponding to the causes of radio disturbances in each of embodiments of the present invention.

Namely, in the case of the indicator "Received Level", when the cause of a radio disturbance is the "blocking", the Received Level "abruptly largely drops". Further, when the cause of the radio disturbance is the "shadowing", the Received Level "abruptly slightly drops". Moreover, when the cause of the radio disturbance is the "fading", the Received Level "varies at a short cycle (or period)". Furthermore, when the cause of a radio disturbance is the "faulty tracking", the Received Level "slowly drops". Additionally, when the cause of a radio disturbance is the "beam switching", the Received Level "slowly drops".

The indicators "Received-Signal C/N", "Received-Signal BER" and "Received-Signal PER" exhibit changes similar to the indicator "Received Level". The other indicators change as described in this figure.

The aforementioned countermeasure means performs the countermeasures corresponding to the inferred cause of the radio disturbance, as illustrated in FIG. 2. FIG. 2 is a diagram illustrating a table which presents countermeasures corresponding to the causes of the radio disturbances. When there are a plurality of causes of the radio disturbance, the corresponding countermeasures, which can be simultaneously performed, are carried out at the same time. Further, the corresponding countermeasures, which cannot be simultaneously performed, are carried out in the order of priorities thereof.

Namely, when the cause of the radio disturbance is the "blocking", the system "stops the update of parameters concerning the receiver" and further, "stops the step tracking performed by the tracking unit". When the cause of the radio disturbance is the "shadowing", the system "increases (or raises) the transmitting/receiving gain". When the cause of the radio disturbance is the "fading", the system "changes the pointing direction of the antenna". When the cause of the radio disturbance is the "faulty tracking", the system "corrects the tracking error" and further, "performs a reseizing operation". Moreover, when the cause of the radio disturbance is the "beam switching", the system "switches the current frequency to the frequency of an electromagnetic wave belonging to an adjacent beam".

Incidentally, in FIG. 2, when the pointing direction of the antenna is changed as the countermeasure in the case that the cause of the radio disturbance is the "fading", if a space diversity antenna is used, the alteration of the parameter concerning a corresponding synthesizing circuit is included in this countermeasure. Thus, by performing the countermeasure corresponding to the inferred cause which is obtained by the fault inferring means, the communication system is immediately put into a state, in which a communication can be established with another system, when recovering from the disturbance, or when eliminating a cause thereof.

Embodiment 1

The configuration of Embodiment 1 of the present invention will be described hereunder by referring to FIG. 3. FIG. 3 is a diagram illustrating the configuration of a mobile communication system which is Embodiment 1 of the present invention. Incidentally, in the figures, same reference characters designate same or corresponding parts of the system.

As shown in this figure, the mobile communication system, which is Embodiment 1 of the present invention, is provided with an antenna 1 for transmitting and receiving an electromagnetic wave, a tracking unit 2 for adjusting a pointing direction of this antenna 1 to a direction in which an electromagnetic wave arrives, a receiver 3 for demodulating a received electromagnetic wave, a transmitter 4 for modulating information, which is to be transmitted, onto an electromagnetic wave, a handset 5 for displaying information to a user and for receiving an instruction from a user, and a control unit 6A for controlling the tracking unit 2, the receiver 3, the transmitter 4 and the handset 5. Incidentally, in the following description, there will been described the embodiments of the present invention that is provided with the tracking unit 2. However, the present invention may be applied to a simplified mobile communication system which is not provided with the tracking unit 2. Additionally, the handset 5 may be omitted.

Further, as shown in this figure, the aforementioned control unit 6A has: a countermeasure means 62A, which contains a plurality of countermeasures (programs) (namely, Countermeasure 1, Countermeasure 2, . . . , Countermeasure n), a display means 63 and a fault inferring means 64 which includes a plurality of monitor signaling channels connected in parallel (incidentally, these channels may contain signaling channels, into which no low-pass filters are inserted, and further may contain signaling channels into which low-pass filters are inserted).

Figure 4:
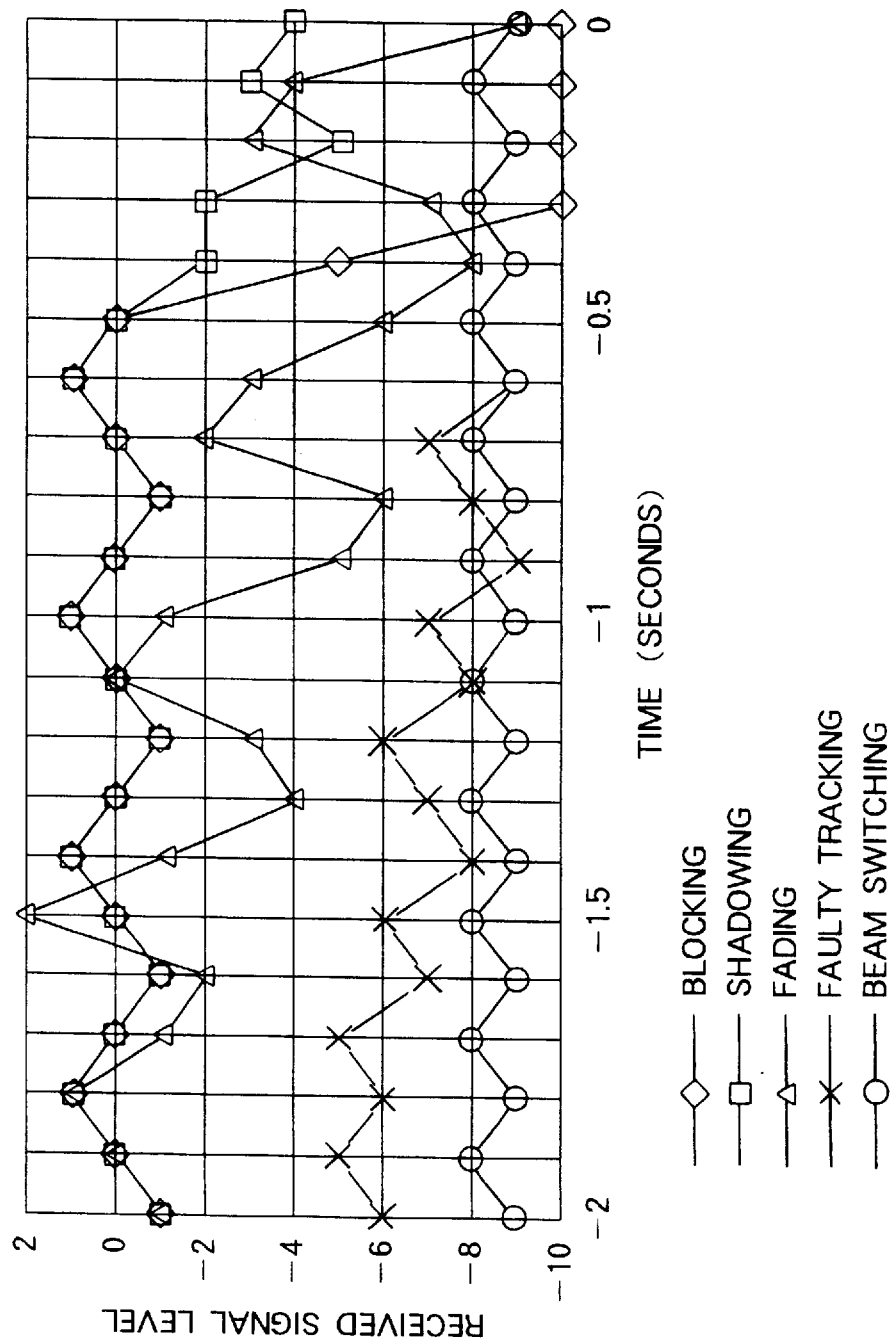
FIG. 4 is a graph illustrating the variation of the level of a received signal with time in the case that no low-pass filter is used in Embodiment 1 of the present invention.
Figure 5:
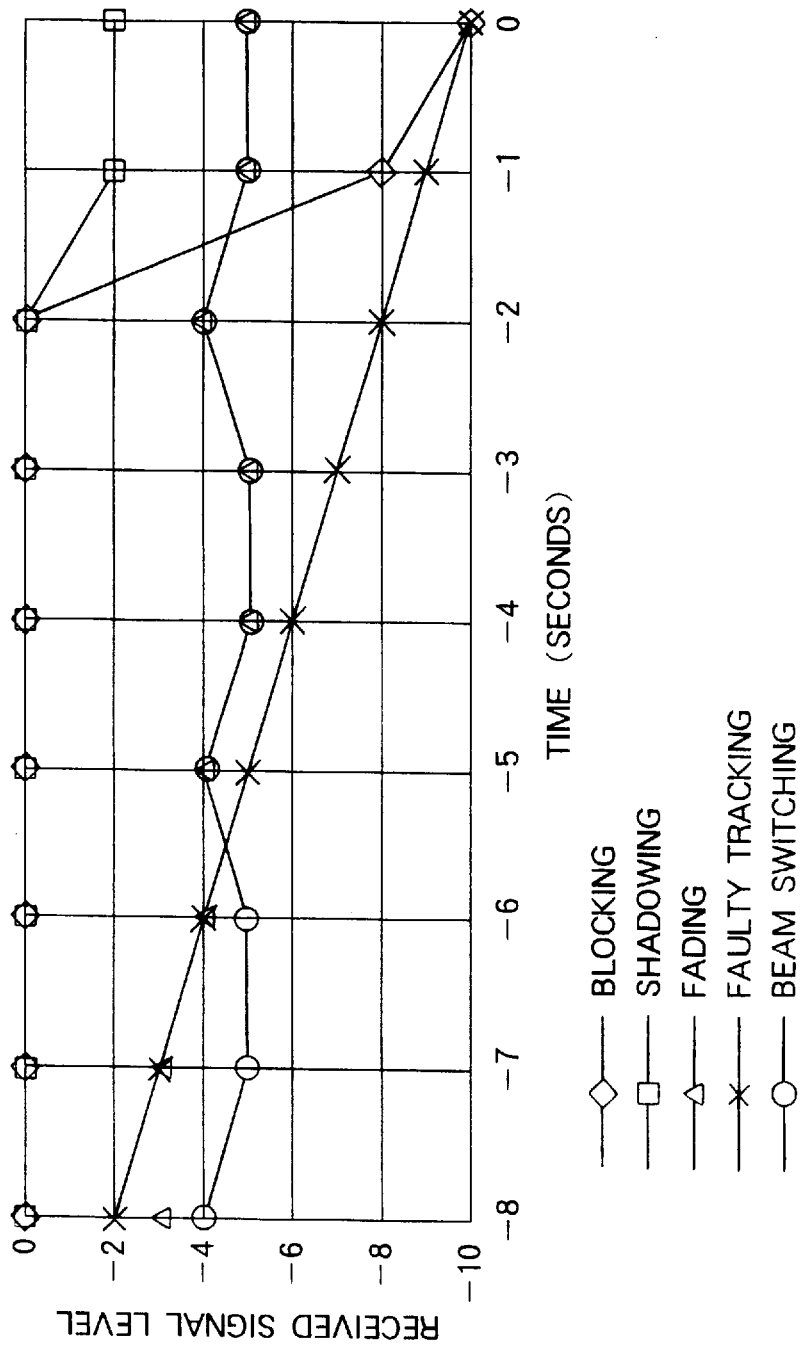
FIG. 5 is a graph illustrating the variation of the level of a received signal with time in the case that a low-pass filter is used in Embodiment 1 of the present invention.

Next, an operation of this Embodiment 1 will be described hereinbelow by referring to FIGS. 4, 5 and 6. FIG. 4 is a graph illustrating the variation of the level of a received signal with time in the case that no low-pass filter is used in this Embodiment 1 of the present invention. Further, FIG. 5 is a graph illustrating the variation of the level of a received signal with time in the case that a low-pass filter is used in this Embodiment 1 of the present invention. Moreover, FIG. 6 is a flowchart illustrating an operation of the fault inferring means of this Embodiment 1 of the present invention.

In FIG. 4, the axis of abscissa designates time (in seconds); and the axis of ordinate the received signal level (in dB). Further, a line graph drawn through rhombuses represents the variation of the received signal level with time corresponding to the case that the cause is the "blocking"; another line graph drawn through squares represents the variation of the received signal level with time corresponding to the case that the cause is the "shadowing"; a further line graph drawn through triangles represents the variation of the received signal level with time corresponding to the case that the cause is the "fading"; still another line graph drawn through crosses represents the variation of the received signal level with time corresponding to the case that the cause is the "faulty tracking"; and yet another line graph drawn through circles represents the variation of the received signal level with time corresponding to the case that the cause is the "beam switching". Further, in FIG. 5, the axis of abscissa designates time (in seconds); and the axis of ordinate the received signal level (in dB). Moreover, the marks used to represent the kinds of the causes of the radio disturbance are the same as in the case of FIG. 4. Incidentally, characteristics shown in FIGS. 4 and 5 somewhat vary with the communication system. It is thus necessary to study the patterns correspondingly to the communication system and to regulate the characteristics according to results of the study.

When powering this mobile communication system, objective electromagnetic waves are seized under the control of the control unit 6A, similarly as in the case of the known mobile communication system. Thereafter, a signal representing the received (signal) level obtained from the receiver 3 is inputted to the fault inferring means 64 and thus is monitored.

Figure 6:
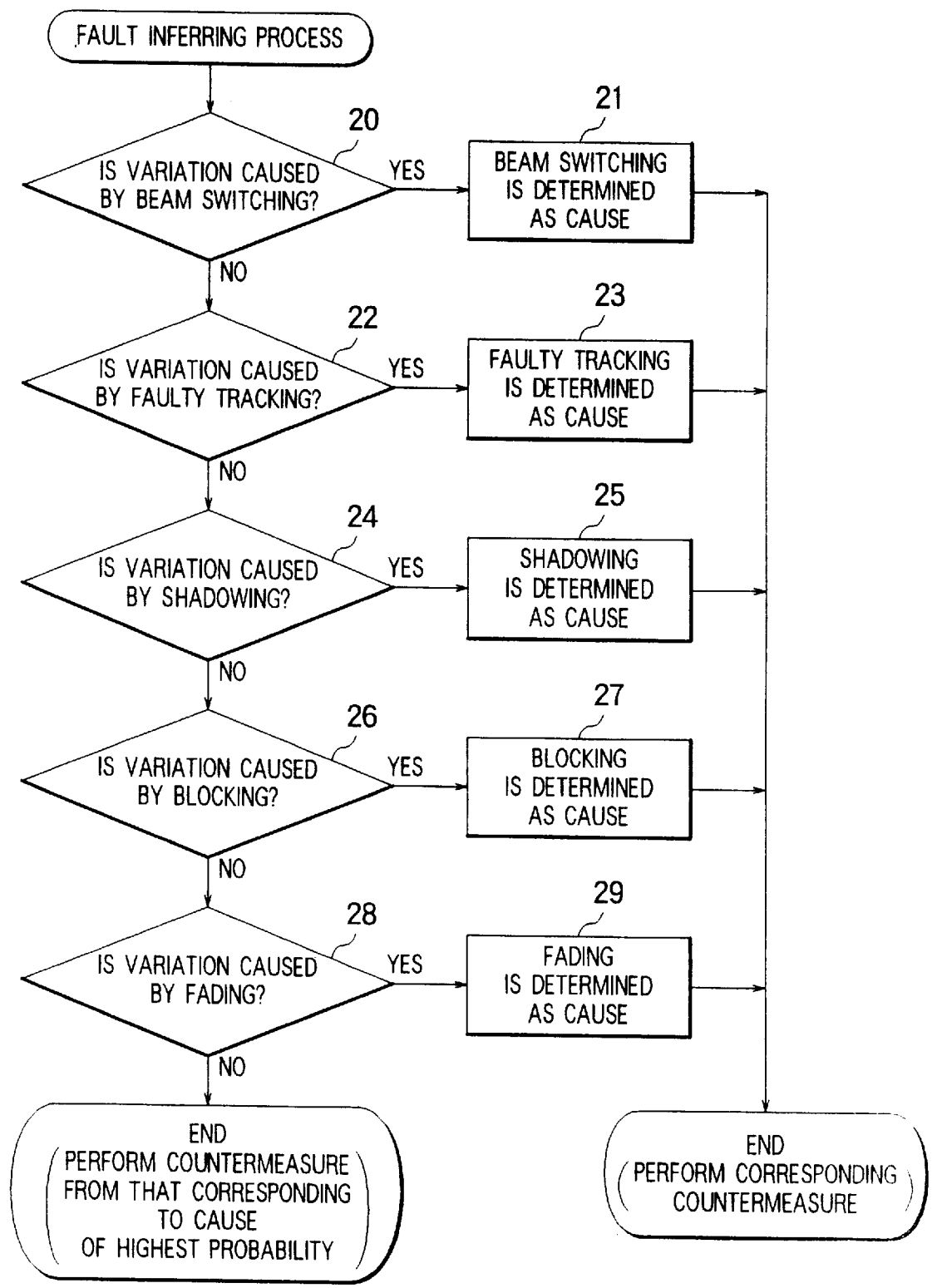
FIG. 6 is a flowchart illustrating an operation of fault inferring means of Embodiment 1 of the present invention.

In this fault inferring means 64, by performing the process of FIG. 6, it is judged what patterns of FIGS. 4 and 5 are closest to the variation of the received level of a signal, which has not passed through a low-pass filter, with time and the variation of the received level of a signal, which has passed through a low-pass filter, with time, respectively. Although the received level of a signal, which has not passed through a low-pass filter, and the received level of a signal, which has passed through a low-pass filter, are used in the case of this embodiment, the received levels obtained by employing various kinds of time constants may be used. Namely, both of the received level of a signal, which has passed through a low-pass filter having a first time constant, and the received level of a signal, which has passed through a low-pass filter having a second time constant may be used.

In step 20, the fault inferring means 64 judges whether or not the variation of the received level of a signal, which has not passed through a low-pass filter, with time and the variation of the received level of a signal, which has passed through a low-pass filter, with time, respectively. Although the received level of a signal, which has not passed through a low-pass filter, are caused by the "beam switching". If not, a program of FIG. 6 advances to step 22. If so, it is judged in the next step 21 that the cause is the "beam switching". Then, the countermeasure means 62A switches the current frequency to the frequency of an electromagnetic wave belonging to the adjacent beam, as illustrated in FIG. 2.

Namely, as illustrated in FIGS. 4 and 5, in the case that the received level "slowly drops" in a long time period, the "beam switching" is determined as the cause of the radio disturbance.

Next, in step 22, the fault inferring means 64 judges whether or not the variation of the received level with time is caused by the "faulty tracking". If not, the program advances to step 24. If so, it is determined in the next step 23 that the cause is the "faulty tracking". Thus, the countermeasure means 62A corrects a tracking error and performs the reseizing operation, as illustrated in FIG. 2.

Namely, as illustrated in FIGS. 4 and 5, in the case that the received level "slowly drops" in a relatively short time period in comparison with the case of the "beam switching", the "faulty tracking" is determined as the cause of the radio disturbance. In the case of the example of FIG. 5, the received level "slowly drops" at the rate of about 1 dB/minute.

Next, in step 24, the fault inferring means 64 judges whether or not the variation of the received level with time is caused by the "shadowing". If not, the program advances to step 26. If so, it is determined in the next step 25 that the cause is the "shadowing". Thus, the countermeasure means 62A increases the transmitting/receiving gain, as illustrated in FIG. 2.

Namely, as illustrated in FIGS. 4 and 5, in the case that the received level "abruptly drops", the "shadowing" is determined as the cause of the radio disturbance.

Subsequently, in step 26, the fault inferring means 64 judges whether or not the variation of the received level with time is caused by the "blocking". If not, the program advances to step 28. If so, it is determined in the next step 27 that the cause is the "blocking". Thus, the countermeasure means 62A stops the update of the parameter concerning the receiver 3 and also stops the step tracking performed by the tracking unit 2, as illustrated in FIG. 2.

Namely, as illustrated in FIGS. 4 and 5, in the case that the received level "abruptly largely drops", the "blocking" is determined as the cause of the radio disturbance.

Next, in step 28, the fault inferring means 64 judges whether or not the variation of the received level with time is caused by the "fading". If not, the processing is terminated. If so, it is determined in the next step 29 that the cause is the "fading". Thus, the countermeasure means 62A changes the pointing direction of the antenna, as illustrated in FIG. 2.

Namely, as illustrated in FIGS. 4 and 5, in the case that the received level "varies at a short cycle or period", the "fading" is determined as the cause of the radio disturbance.

Furthermore, the patterns of the variation with time may be judged by utilizing various methods, such as a pattern matching technique, a technique using a fuzzy theory, alternatively, a method of simply using a difference from the received level before a time period corresponding to the time constant.

As above described, the countermeasure means 62A selects and performs a countermeasure of FIG. 2 according to the cause of the radio disturbance, which is inferred by the fault inferring means 64. Incidentally, similarly as in the case of the known mobile communication system, the reception synchronization state is used for judging whether or not the system is restored from the radio disturbance to a normal state thereof. Namely, the judgment on the removal of the cause of the radio disturbance is made according to whether or not the timing and position of a synchronization signal are normal.

In the case of this Embodiment 1, the communication system, such as that mounted on the mobile unit, in which a fault of the receiving line or circuit is dynamically caused, has the function of inferring the cause of a radio disturbance and the function of taking and performing suitable countermeasure against the inferred cause. This Embodiment 1, thus, has an advantage over the known mobile communication system in that the recovery from the radio disturbance can be immediately achieved. This results not only in a simple increase in the length of time in which users can utilize the communication system but also in increasing the possibility of establishing actual communications even in places where the frequency of occurrences of the radio disturbance is high.

Embodiment 2

Figure 7:
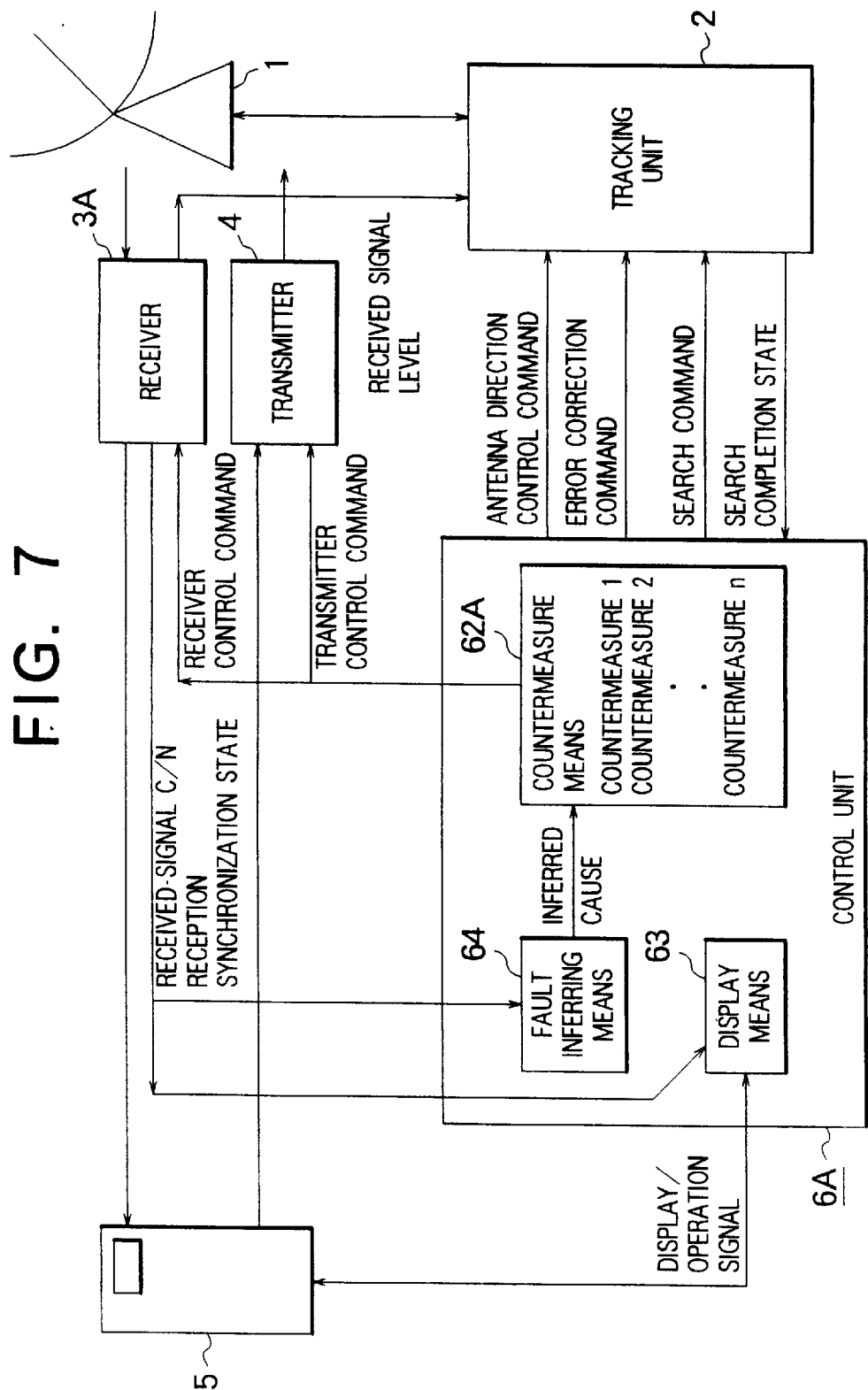
FIG. 7 is a diagram illustrating the configuration of a mobile communication system which is Embodiment 2 of the present invention.

Embodiment 2 of the present invention will be described hereunder by referring to FIG. 7. FIG. 7 is a diagram illustrating the configuration of a mobile communication system which is this Embodiment 2 of the present invention.

As shown in this figure, the mobile communication system, which is Embodiment 2 of the present invention, is provided with an antenna 1 for transmitting and receiving an electromagnetic wave, a tracking unit 2 for adjusting a pointing direction of this antenna 1 to a direction in which an electromagnetic wave arrives, a receiver 3A for demodulating a received electromagnetic wave, a transmitter 4 for modulating information, which is to be transmitted, to an electromagnetic wave, a handset 5 for displaying information to a user and for receiving an instruction from a user, and a control unit 6A for controlling the tracking unit 2, the receiver 3A, the transmitter 4 and the handset 5.

Moreover, in this figure, the control unit 6A has a countermeasure means 62A containing a plurality of countermeasure (programs) (namely, Countermeasure 1, Countermeasure 2, . . . , Countermeasure n), a display means 63 and a fault inferring means 64.

Although the variation of the received signal level is used for inferring a cause of the radio disturbance in the aforesaid Embodiment 1, the receiver 3A being capable of obtaining the received-signal C/N (Carrier to Noise Ratio) is used in this Embodiment 2, instead of the variation of the received level. The remaining composing elements of this Embodiment 2 are similar to those of the aforementioned Embodiment 1.

In the case that a correct received-signal C/N is obtained at a measurement cycle or period which is shorter than the cycle of the variation due to the fading, the judgement is achieved with higher precision. Usually, ordinary communication systems are not adapted to obtain such a received-signal C/N. However, it is often that the judgement on the beam switching is achieved with high accuracy, because the influence of the frequency characteristics of the receiver is decreased in the case of using the received-signal C/N.

Embodiment 3

Figure 8:
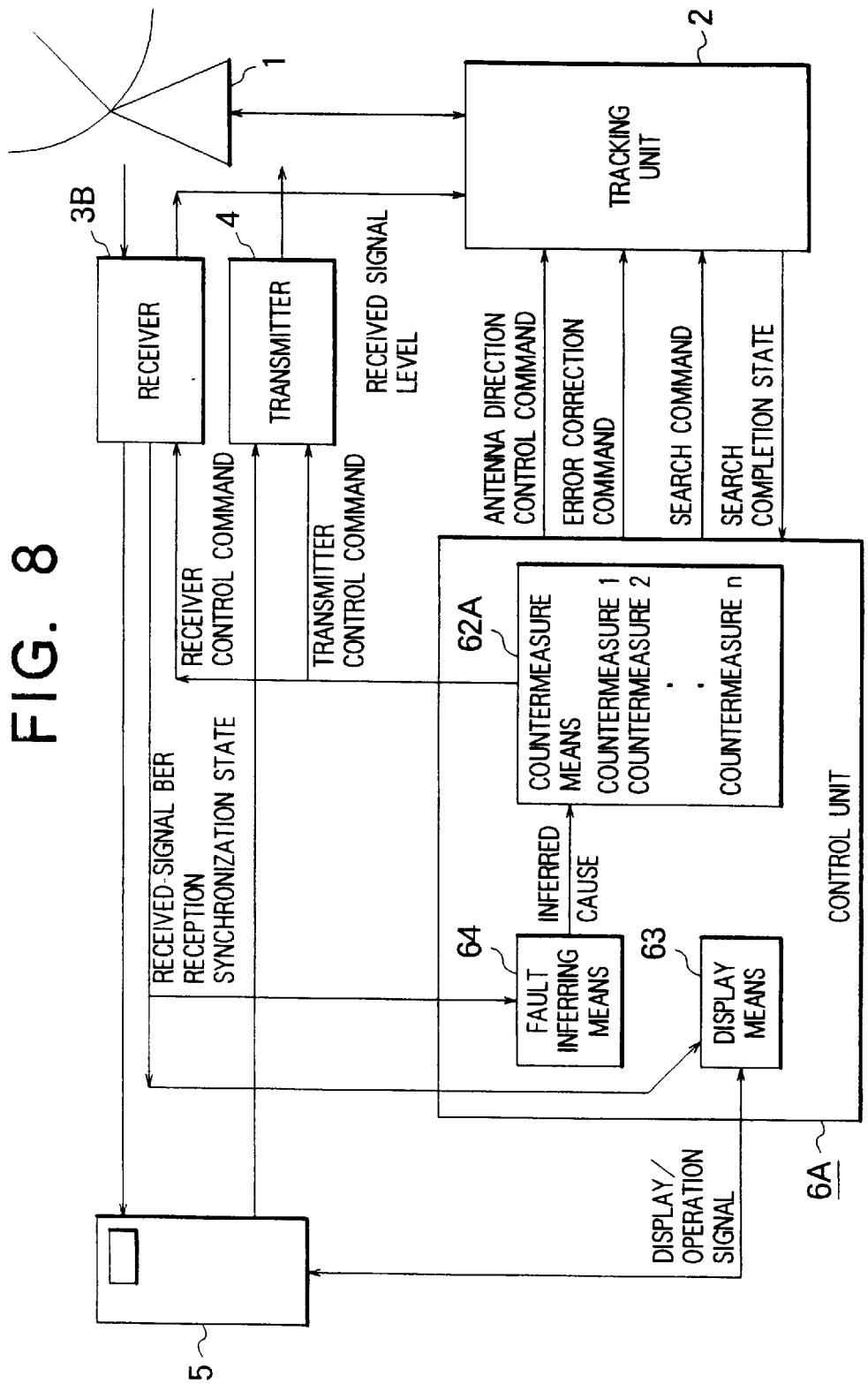
FIG. 8 is a diagram illustrating the configuration of a mobile communication system which is Embodiment 3 of the present invention.

Embodiment 3 of the present invention will be described hereunder by referring to FIG. 8. FIG. 8 is a diagram illustrating the configuration of a mobile communication system which is this Embodiment 3 of the present invention.

As shown in this figure, the mobile communication system, which is Embodiment 3 of the present invention, is provided with an antenna 1 for transmitting and receiving an electromagnetic wave, a tracking unit 2 for adjusting a pointing direction of this antenna 1 to a direction in which an electromagnetic wave arrives, a receiver 3B for demodulating a received electromagnetic wave, a transmitter 4 for modulating information, which is to be transmitted, to an electromagnetic wave, a handset 5 for displaying information to a user and for receiving an instruction from a user, and a control unit 6A for controlling the tracking unit 2, the receiver 3B, the transmitter 4 and the handset 5.

Moreover, in this figure, the control unit 6A has a countermeasure means 62A containing a plurality of countermeasure (programs) (namely, Countermeasure 1, Countermeasure 2, . . . , Countermeasure n), a display means 63 and a fault inferring means 64.

Although the variation of the received signal level is used for inferring a cause of the radio disturbance in the aforesaid Embodiment 1, the receiver 3B being capable of obtaining the received-signal BER (Bit Error Rate) is used in this Embodiment 3, instead of the variation of the received level. The remaining composing elements of this Embodiment 3 are similar to those of the aforementioned Embodiment 1.

Received-signal BER is sometimes obtained in a communication system adapted to perform a digital modulation. However, usually, ordinary communication systems are not adapted to obtain such a received-signal BER. Instead, some communication system using analog information at the time of modulation or using error correction codes are able to measure an inferred received-signal BER by using error numbers at the time of demodulation. By utilizing this inferred received-signal BER and establishing a similar configuration, advantages or effects similar to those of this Embodiment 3 are obtained.

Further, in the case that the received-signal BER =is obtained at a measurement cycle which is shorter than the cycle of the variation due to the fading, the judgement is achieved with high accuracy by using the received-signal BER, similarly as in the case of using the received-signal C/N.

Embodiment 4

Figure 9:
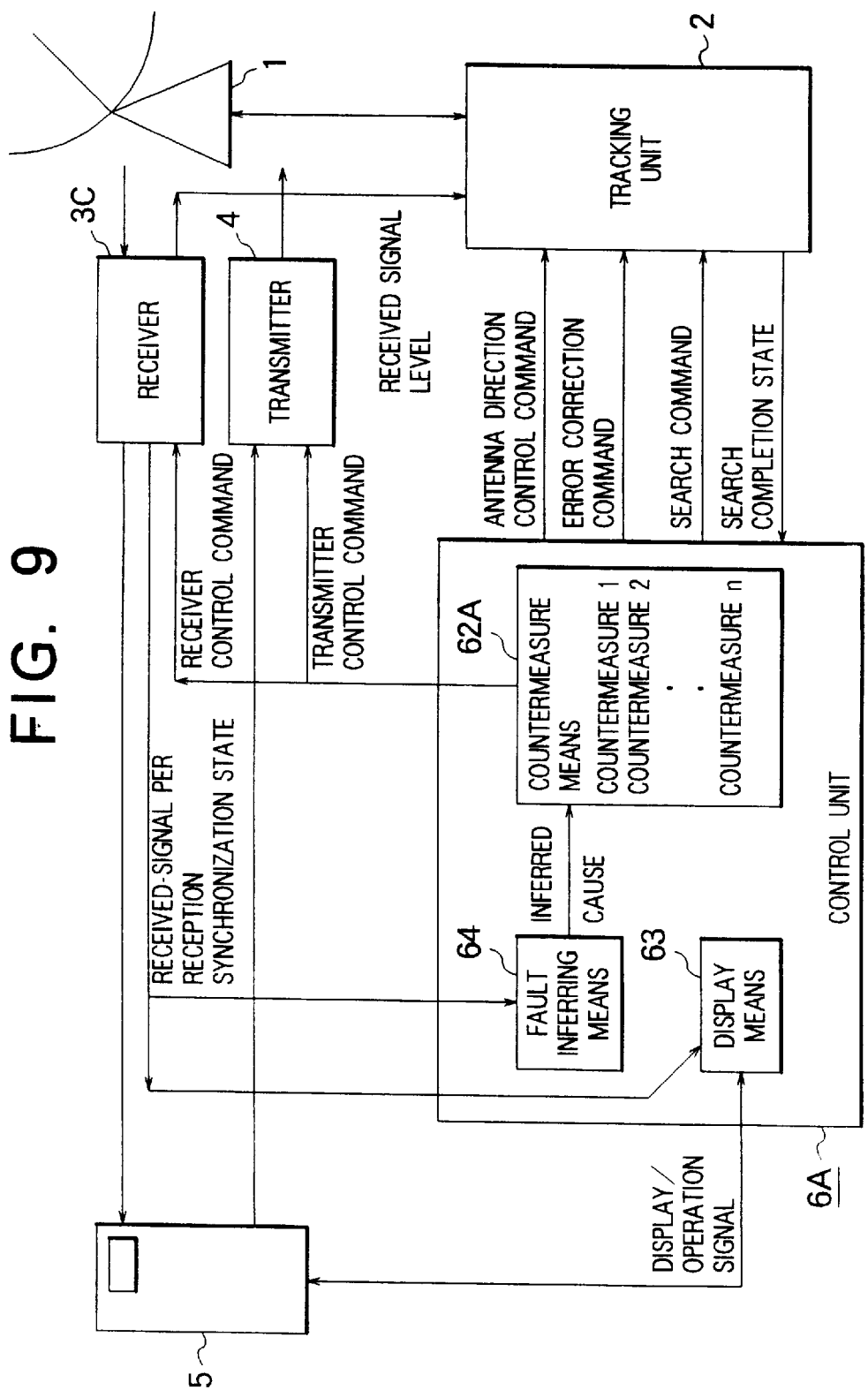
FIG. 9 is a diagram illustrating the configuration of a mobile communication system which is Embodiment 4 of the present invention.

Embodiment 4 of the present invention will be described hereunder by referring to FIG. 9. FIG. 9 is a diagram illustrating the configuration of a mobile communication system which is this Embodiment 4 of the present invention.

As shown in this figure, the mobile communication system, which is Embodiment 4 of the present invention, is provided with an antenna 1 for transmitting and receiving an electromagnetic wave, a tracking unit 2 for adjusting a pointing direction of this antenna 1 to a direction in which an electromagnetic wave arrives, a receiver 3C for demodulating a received electromagnetic wave, a transmitter 4 for modulating information, which is to be transmitted, to an electromagnetic wave, a handset 5 for displaying information to a user and for receiving an instruction from a user, and a control unit 6A for controlling the tracking unit 2, the receiver 3C, the transmitter 4 and the handset 5.

Moreover, in this figure, the control unit 6A has a countermeasure means 62A containing a plurality of countermeasure (programs) (namely, Countermeasure 1, Countermeasure 2, . . . , Countermeasure n), a display means 63 and a fault inferring means 64.

Although the variation of the received signal level is used for inferring a cause of the radio disturbance in the aforesaid Embodiment 1, the receiver 3C being capable of detecting an error in a received data packet and obtaining the received-signal PER (Packet Error Rate) is used in this Embodiment 4, instead of the variation of the received level. The remaining composing elements or the remaining structure of this Embodiment 4 are similar to those of the aforementioned Embodiment 1.

Embodiment 5

Figure 10:
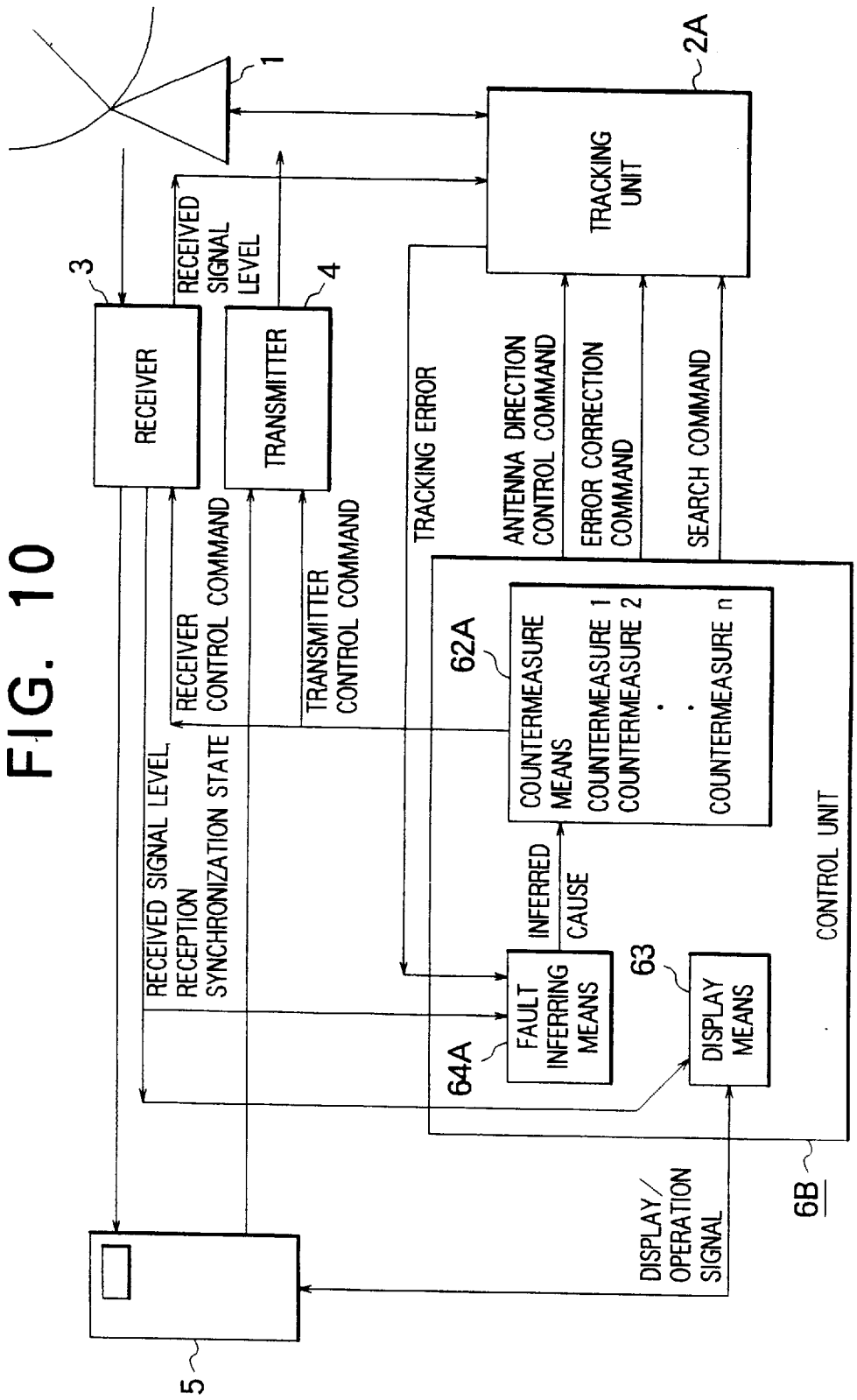
FIG. 10 is a diagram illustrating the configuration of a mobile communication system which is Embodiment 5 of the present invention.

Embodiment 5 of the present invention will be described hereunder by referring to FIG. 10. FIG. 10 is a diagram illustrating the configuration of a mobile communication system which is this Embodiment 5 of the present invention.

As shown in this figure, the mobile communication system, which is Embodiment 5 of the present invention, is provided with an antenna 1 for transmitting and receiving an electromagnetic wave, a tracking unit 2A for adjusting a pointing direction of this antenna 1 to a direction in which an electromagnetic wave arrives, a receiver 3 for demodulating a received electromagnetic wave, a transmitter 4 for modulating information, which is to be transmitted, to an electromagnetic wave, a handset 5 for displaying information to a user and for receiving an instruction from a user, and a control unit 6B for controlling the tracking unit 2A, the receiver 3, the transmitter 4 and the handset 5.

Moreover, in this figure, the control unit 6B has a countermeasure means 62A, a display means 63 and a fault inferring means 64A which includes a plurality of monitor signaling channels connected in parallel (incidentally, these channels may contain signaling channels, into which no low-pass filters are inserted, and further may contain signaling channels into which low-pass filters are inserted).

Although the variation of the received signal level is used for inferring a cause of the radio disturbance in the aforesaid Embodiment 1, a judgement on the faulty tracking is done with high accuracy by configuring the system as illustrated in FIG. 10, in the case that a tracking error is obtained. Namely, as shown in FIG. 1, the tracking error becomes large only when the cause of the radio disturbance is the faulty tracking, whereas the tracking error does not change in the case of the other causes of the radio disturbance. The remaining part of the structure is similar to the corresponding part of the aforementioned Embodiment 1.

There are several methods of obtaining tracking errors. For example, in the case of one of such methods, a plurality of direction sensors are used and further, the variation in outputs thereof is utilized. Alternatively, in the case of another method, a plurality of sensors such as a direction sensor and an angular-speed sensor (or an acceleration sensor) are used and the difference among outputs thereof is utilized. In addition, in the case of still another method, a tracking error, which is merely an estimated value, is obtained from the length of a time period, during which signals are kept received, or from the accumulated value of a shifted amount of the pointing direction of the antenna.

Embodiment 6

Figure 11:
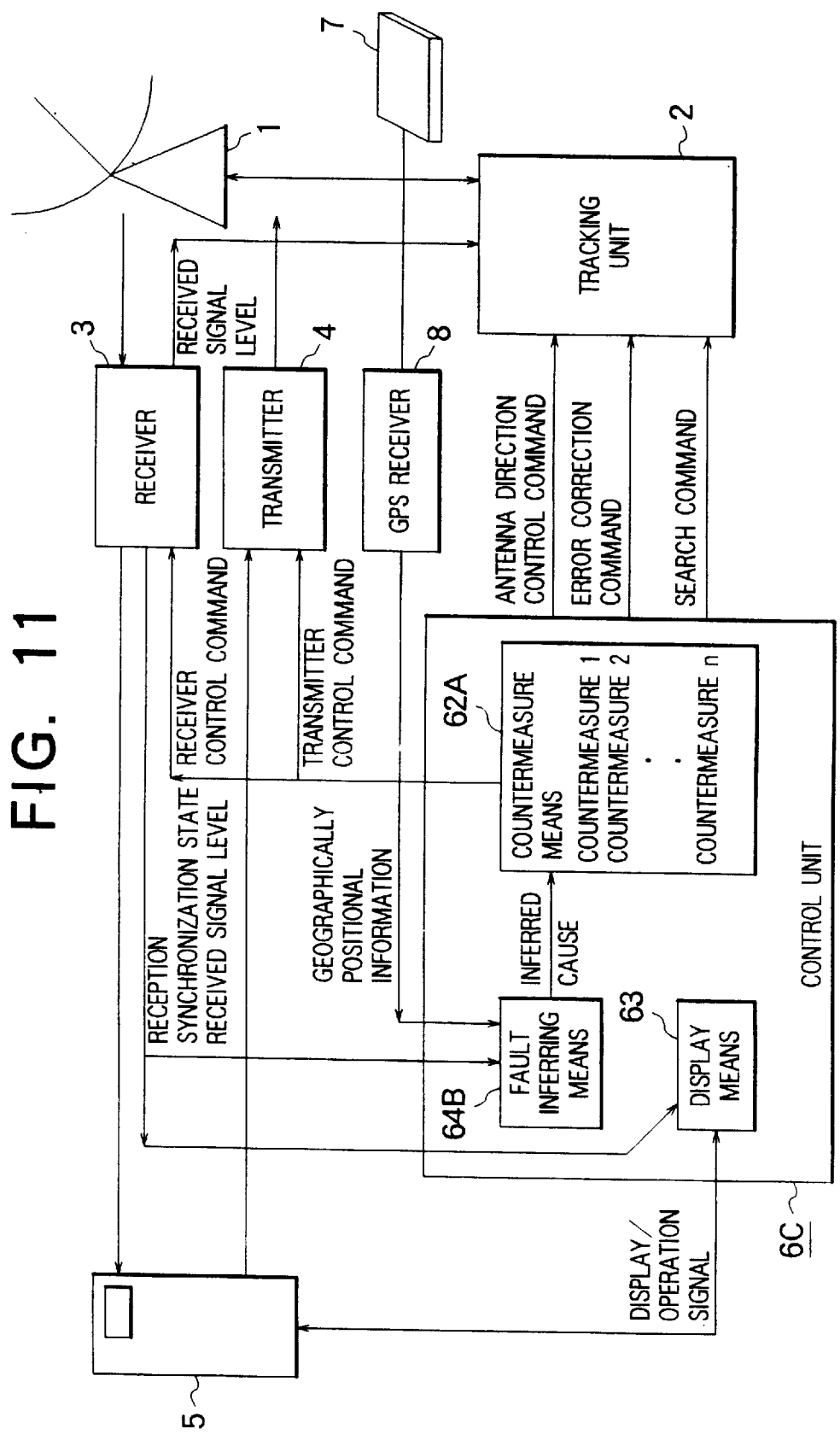
FIG. 11 is a diagram illustrating the configuration of a mobile communication system which is Embodiment 6 of the present invention.

Embodiment 6 of the present invention will be described hereunder by referring to FIG. 11. FIG. 11 is a diagram illustrating the configuration of a mobile communication system which is this Embodiment 6 of the present invention.

As shown in this figure, the mobile communication system, which is Embodiment 6 of the present invention, is provided with: an antenna 1 for transmitting and receiving an electromagnetic wave; a tracking unit 2 for adjusting a pointing direction of this antenna 1 to a direction in which an electromagnetic wave arrives; a receiver 3 for demodulating a received electromagnetic wave; a transmitter 4 for modulating information, which is to be transmitted, to an electromagnetic wave; a handset 5 for displaying information to a user and for receiving an instruction from a user, a control unit 6C for controlling the tracking unit 2, the receiver 3, the transmitter 4 and the handset 5; a GPS antenna 7; and a GPS receiver 8.

Moreover, in this figure, the control unit 6C has a countermeasure means 62A, a display means 63 and a fault inferring means 64B which includes a plurality of monitor signaling channels connected in parallel (incidentally, these channels may contain signaling channels, into which no low-pass filters are inserted, and further may contain signaling channels into which low-pass filters are inserted).

Although the variation of the received signal level is used for inferring a cause of the radio disturbance in the aforesaid Embodiment 1, in the case that geographically positional information representing a position, at which the mobile unit is placed, is obtained, a judgement on the radio disturbance due to the beam switching is made accurately from both of the received signal level and the geographically positional information by configuring the system as illustrated in FIG. 11. Namely, as shown in FIG. 1, the position of the mobile unit, which is indicated by the geographically positional information, is outside a range, in which the beam is irradiated, only when the beam switching is the cause of the radio disturbance.

The GPS (Global Positioning System) receiver 8 is used to demodulate electromagnetic waves, which are used in GPS and are received by the GPS antenna 7, and is further used to obtain information concerning a latitude, a longitude and a height. Such information is transmitted to the fault inferring means 64B. Such information is transmitted to the fault inferring means 64B. The remaining part of the configuration or structure is similar to the corresponding part of the Embodiment 1.

Embodiment 7

Figure 12:
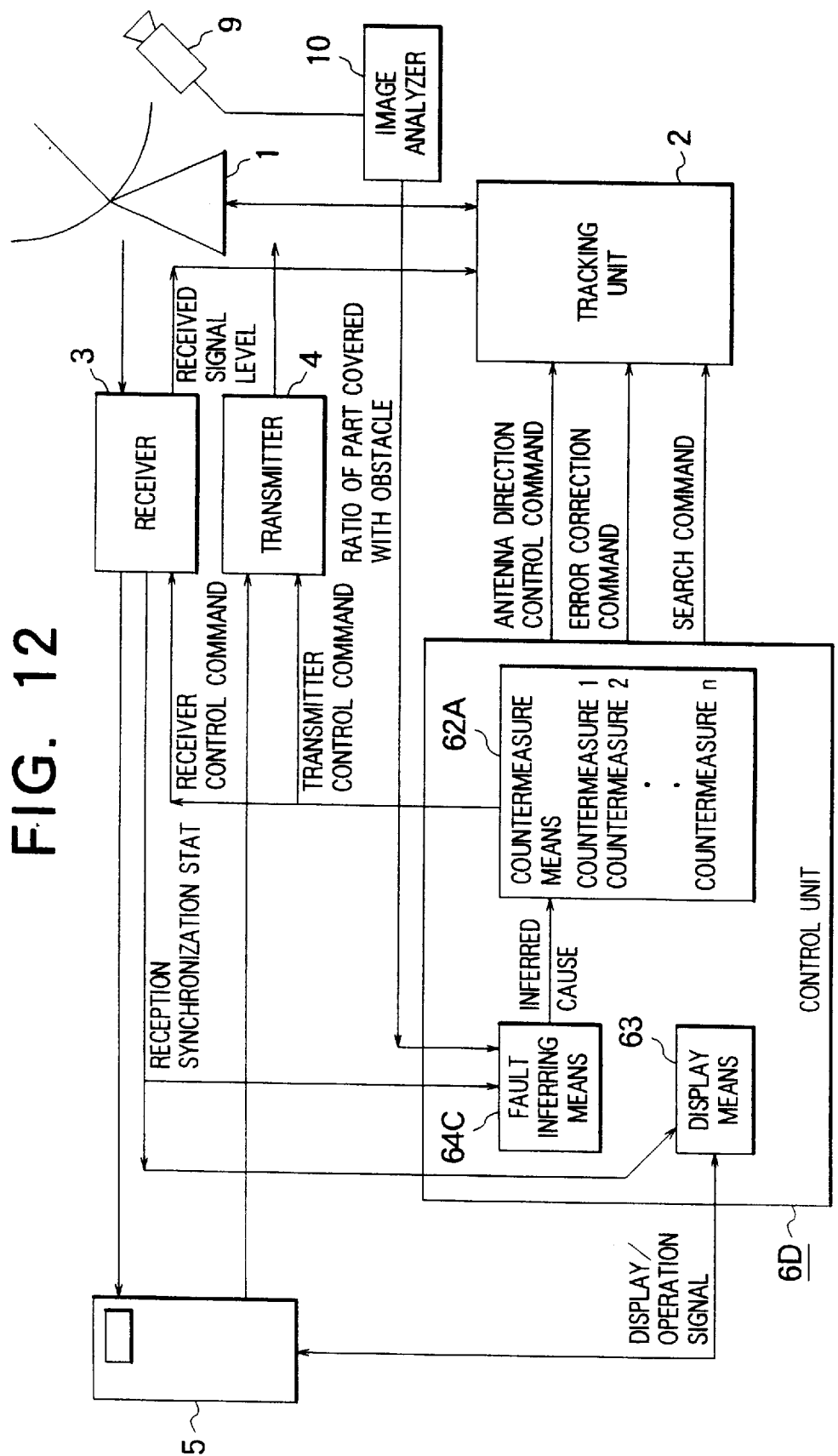
FIG. 12 is a diagram illustrating the configuration of a mobile communication system which is Embodiment 7 of the present invention.
Figure 13:
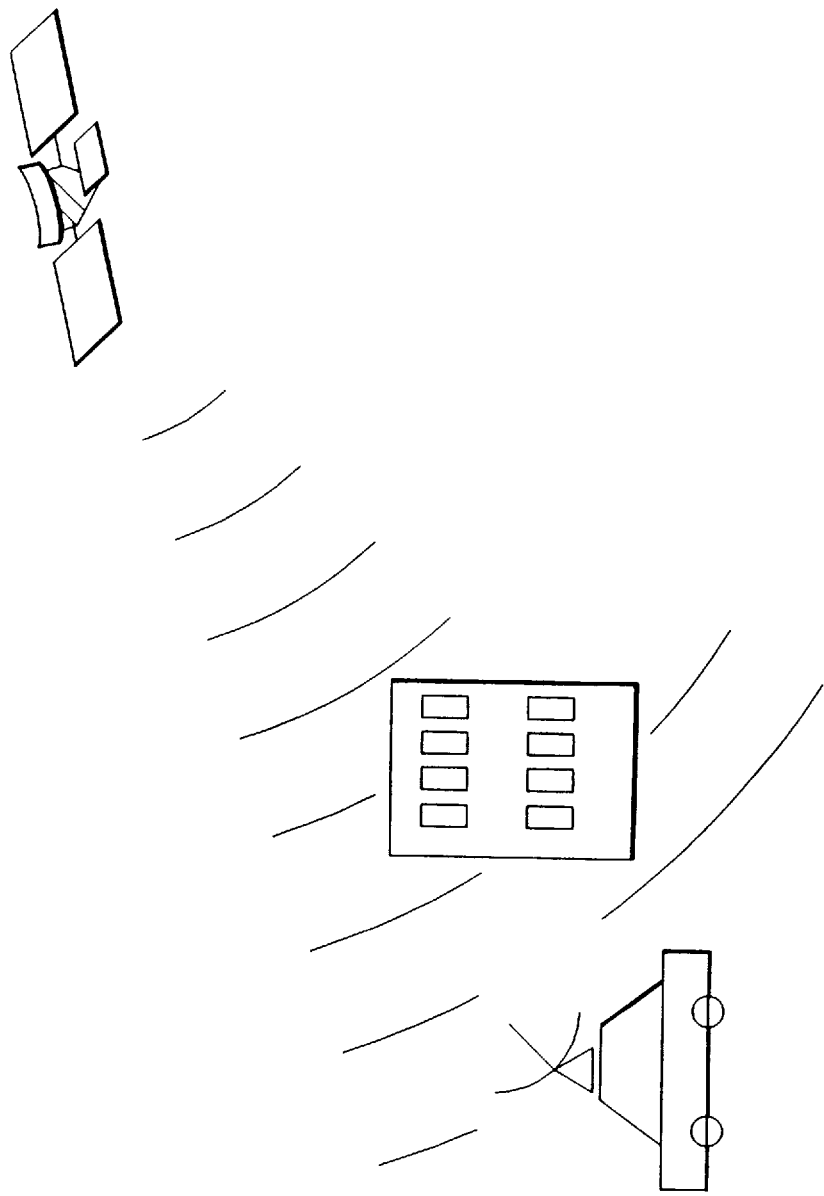
FIG. 13 is a diagram illustrating examples of radio disturbances caused in the mobile communication systems of the present invention and in a privately known but unpublished mobile communication system.
Figure 14:
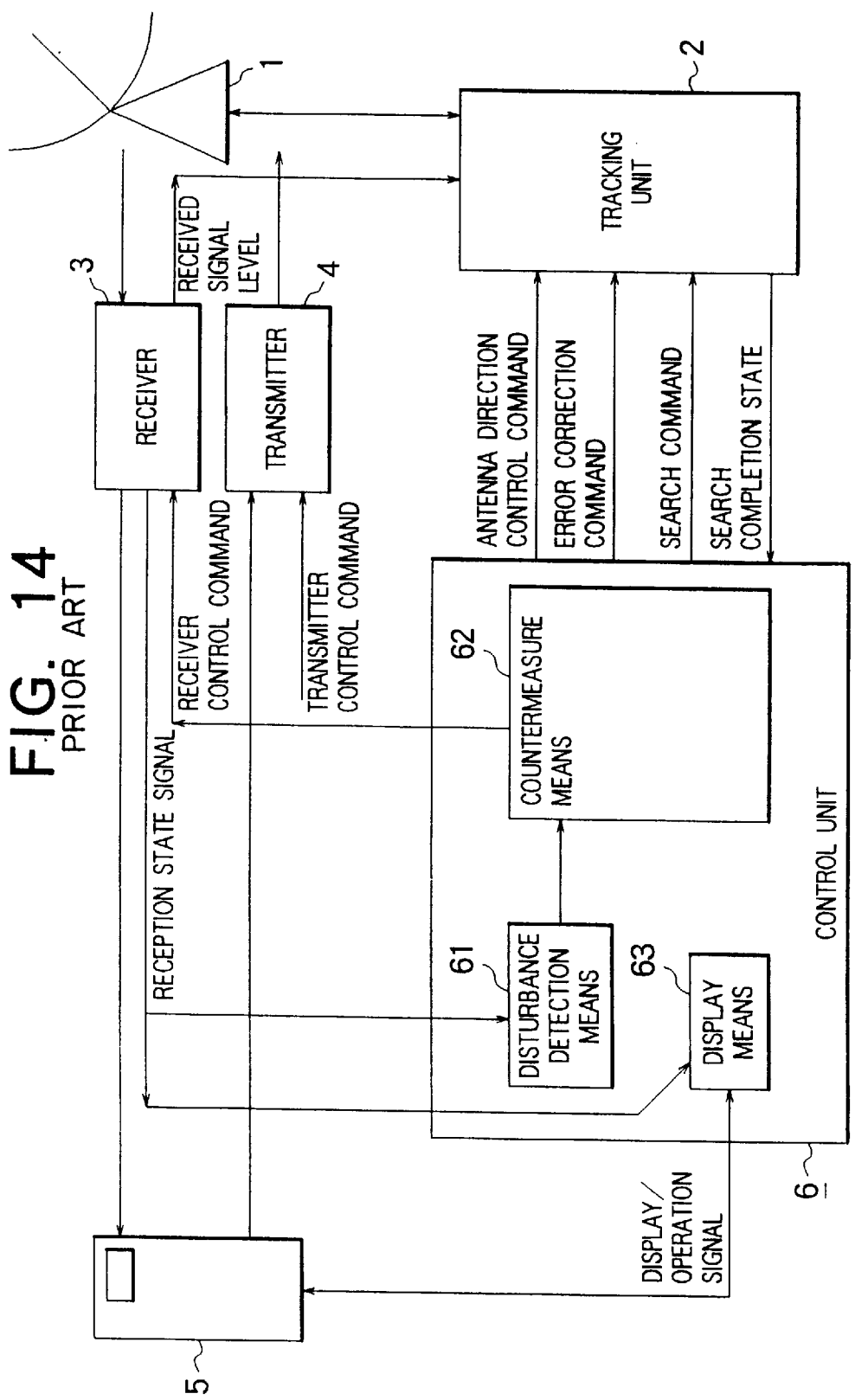
FIG. 14 is a diagram illustrating the configuration of a privately known but unpublished mobile communication system.
Figure 15:
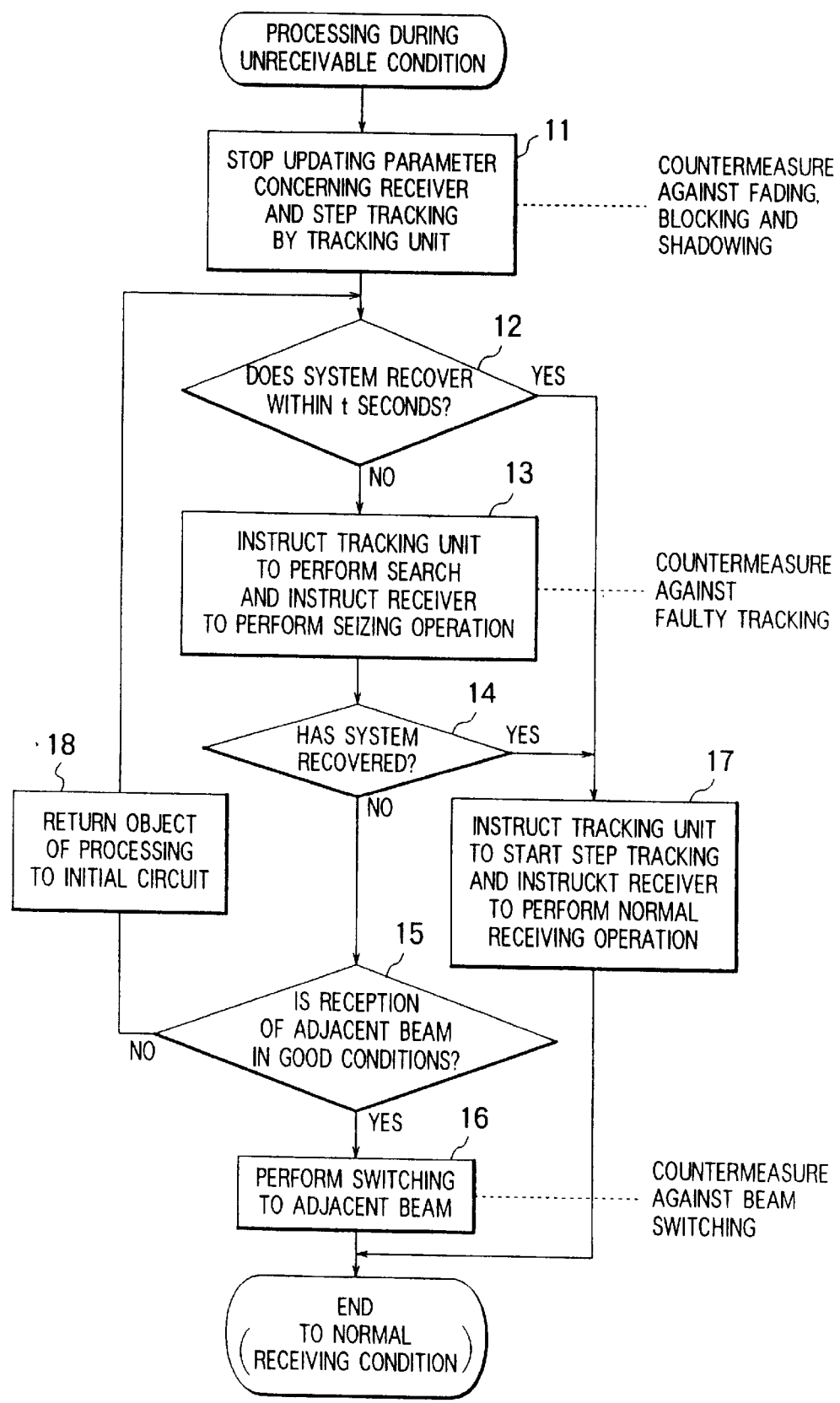
FIG. 15 is a flowchart illustrating an operation of a privately known but unpublished mobile communication system.

Embodiment 7 of the present invention will be described hereunder by referring to FIG. 12. FIG. 12 is a diagram illustrating the configuration of a mobile communication system which is this Embodiment 7 of the present invention.

As shown in this figure, the mobile communication system, which is Embodiment 7 of the present invention, is provided with: an antenna 1 for transmitting and receiving an electromagnetic wave; a tracking unit 2 for adjusting a pointing direction of this antenna 1 to a direction in which an electromagnetic wave arrives; a receiver 3 for demodulating a received electromagnetic wave; a transmitter 4 for modulating information, which is to be transmitted, to an electromagnetic wave; a handset 5 for displaying information to a user and for receiving an instruction from a user, a control unit 6D for controlling the tracking unit 2, the receiver 3, the transmitter 4 and the handset 5; an image input unit 9; and an image analyzer 10.

Moreover, in this figure, the control unit 6D has a countermeasure means 62A, a display means 63 and a fault inferring means 64C which includes a plurality of monitor signaling channels connected in parallel (incidentally, these channels may contain signaling channels, into which no low-pass filters are inserted, and further may contain signaling channels into which low-pass filters are inserted).

Although the variation of the received signal level is used for inferring a cause of the radio disturbance in the aforesaid Embodiment 1, a judgement on the cause of the radio disturbance is made by using an optical image in the case of the mobile communication system, by which an optical image of an obstacle is obtained and the obstacle present in the direction of the base unit can be determined.

In the system of FIG. 12, the image analyzer 10 obtains a ratio of a part, which is covered with an obstacle in a receiving region obtained from a directivity response pattern of the antenna 1 by using lightness difference, of an image, which is obtained from the image input unit 9, to the remaining part of the image. The obtained ratio of the part covered with the obstacle is transmitted to the fault inferring means 64C. The image input unit 9 is placed by being fixed to the antenna 1 in such a way as to point to the same direction as to which the antenna points. The remaining structure of this Embodiment 7 is similar to that of the aforementioned Embodiment 1.

Incidentally, in the case of the aforesaid embodiments of the present invention, one or two kinds of information is used as the indicators used to infer the cause of the radio disturbance. However, a judgement on a cause of the radio disturbance can be achieved with higher accuracy by combining the information of the three kinds or more and inferring the cause.

Moreover, in the case of the aforementioned embodiments, if no communication is recovered even when the countermeasures are performed, the countermeasures are repeatedly performed in the predetermined order, as illustrated in FIG. 6, and similarly as in the case of the known mobile communication system. The mobile communication system, however, is designed in such a manner that the recovery is speeded up by performing the countermeasures against the causes, which are inferred as being caused, in the descending order of the probabilities thereof.

Although the preferred embodiments of the present invention have been described above, it should be understood that the present invention is not limited thereto and that other modifications will be apparent to those skilled in the art without departing from the spirit of the invention.

The scope of the present invention, therefore, is to be determined solely by the appended claims.

What is claimed is:

1. In a novel communication system comprising an antenna for transmitting and receiving an electromagnetic wave, receiving means for demodulating a received electromagnetic wave and producing a received signal, transmitting means for modulating information which is to be transmitted onto an electromagnetic wave, the improvement comprising: control means for inferring a cause of a radio disturbance affecting the received signal and for selecting a counter measure corresponding to the inferred cause of the radio disturbance, said control means comprising storage means for storing a plurality of patterns, each pattern being indicative of response over a selected time period of the mobile communication system to a separate cause for radio disturbance, means for determining correspondence of the received signal with one of the plurality of patterns, countermeasure means for performing a selected one of a plurality of operations for recovery from the radio disturbance and means for selecting the one countermeasure in correspondence with said one pattern.

2. The improvement according to claim 1 wherein said means for determining receives a time varying pattern of the received signal from the receiving means.

3. The improvement according to claim 2 wherein said means for determining comprises means for measuring the level of the received signal.

4. The improvement according to claim 2 wherein said fault inferring means further comprises a further means for storing a time varying pattern of C/N of the received signal.

5. The improvement according to claim 2 wherein said fault inferring means further comprises means for measuring a time varying pattern of BER of the received signal.

6. The improvement according to claims 2 wherein said means for determining further comprises means for measuring a time varying pattern of PER of the received signal.

7. The improvement according to claim 3 wherein said mobile communication system further comprises tracking means for adjusting a pointing direction of the antenna to a direction in which an electromagnetic wave arrives and wherein said means for determining further comprises means for measuring a time varying pattern of the received signal and means for producing a tracking error signal.

8. The improvement according to claim 3 wherein the mobile positioning system further comprises a GPS antenna for receiving geographical positional information and wherein said receiving means comprises GPS receiving means and wherein said means for determining comprises means for responding to the time varying pattern of the level of the received signal and to the geographical positional information from said GPS receiving means.

9. The improvement according to claim 1 wherein said mobile communication system further comprises optical image input means for providing an optical image and wherein said means for determining further comprises means for measuring an optical image obtained from said optical image input means.

10. The improvement according to claim 9 wherein said optical image input means comprises means for pointing said optical input in a same direction as the antenna, means for resolving an obstacle in a receiving region, ratio determining means for determining a ratio of area of the obstacle and a remaining portion of said image and wherein said means for determining utilizes a signal indicative of the ratio from said ratio determining means.

\* \* \* \* \*